United States Patent [19]

Bristow

[11] 4,099,092
[45] Jul. 4, 1978

[54] TELEVISION DISPLAY ALIGNMENT SYSTEM AND METHOD
[75] Inventor: Stephen D. Bristow, San Jose, Calif.
[73] Assignee: Atari, Inc., Sunnyvale, Calif.
[21] Appl. No.: 715,290
[22] Filed: Aug. 18, 1976
[51] Int. Cl.² ............................................ H01J 31/26
[52] U.S. Cl. ...................................... 315/10; 315/370; 315/367
[58] Field of Search .......................... 315/367, 10, 370; 358/212; 250/549; 340/146.3 AE, 146.3 AH

[56] References Cited
U.S. PATENT DOCUMENTS

| 3,333,144 | 7/1967 | Bulk | 315/10 |
| 3,350,505 | 10/1967 | Bakis | 315/10 |

Primary Examiner—Maynard R. Wilbur
Assistant Examiner—T. M. Blum
Attorney, Agent, or Firm—Flehr, Hohbach, Test, Albritton & Herbert

[57] ABSTRACT

System and method in which correction signals are computed and applied individually and automatically to eliminate aberrations produced by non-linearities in the deflection amplifiers, yoke and cathode ray tube of a television display. During a programming period, alignment signals are applied to the deflection circuits in place of the normal scan signal, and the position of the beam on the screen is monitored. When the beam is at predetermined points, the correction signals are computed, and these signals are stored. During normal operation of the television system, the correction signals are addressed in accordance with the beam scan signals, and the correction signals are combined with the scan signals to maintain the beam on the desired path.

8 Claims, 2 Drawing Figures

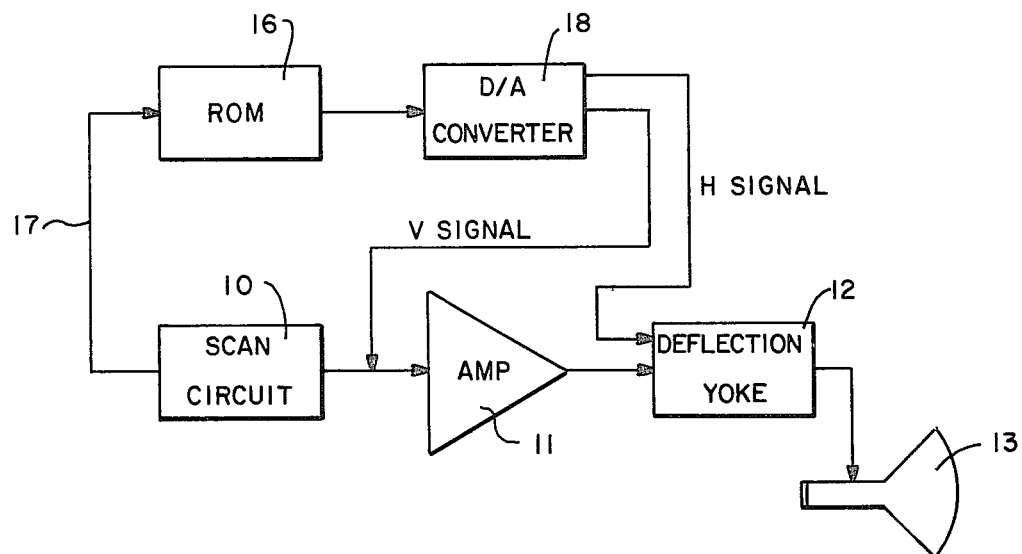
FIG.—1
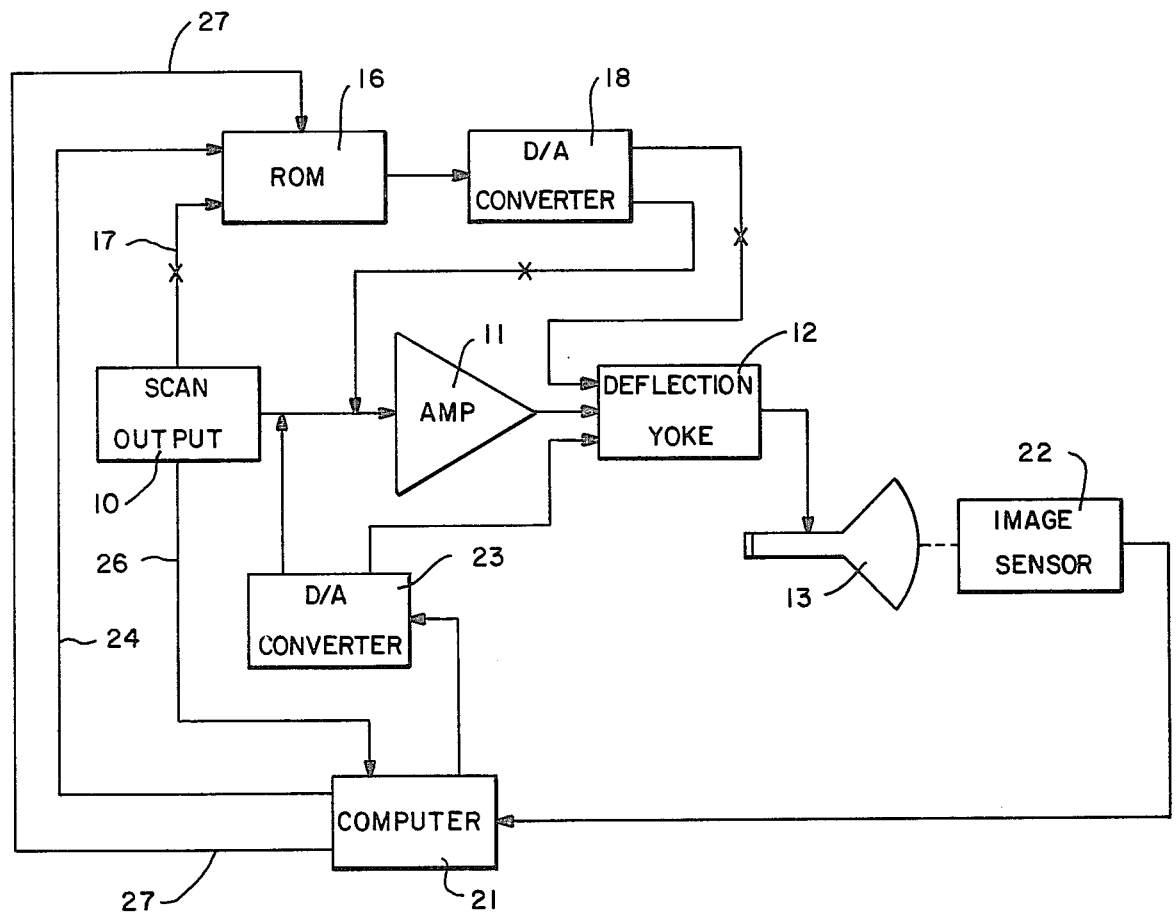
FIG.—2

TELEVISION DISPLAY ALIGNMENT SYSTEM AND METHOD

BACKGROUND OF THE INVENTION

This invention pertains generally to television displays and more particularly to a system and method for aligning a television display to eliminate aberrations in the path of a beam forming the picture.

In television displays of the type commonly utilized in television receivers and monitors, the deflection of a cathode ray tube beam is controlled by ramp signals which are amplified and applied to the windings of a deflection yoke associated with the CRT. Even though the ramp signals may be substantially linear, non-linearities in the amplifier, yoke or CRT can produce visible non-linearities or aberrations in the path of the beam on the face of the CRT.

Heretofore, there have attempts to eliminate such non-linearities and aberrations by the use of permanent magnets positioned on or near the neck of the CRT. These magnets are positioned by hand, and they usually require manual adjustment. There have been other attempts to eliminate the non-linearities or aberrations by applying periodic correction signals to the scanning circuits. These signals are adjusted manually, and they generally do not eliminate all of the non-linearities and aberrations. These manual techniques are time consuming and expensive in a production environment, and they seldom provide completely satisfactory results.

SUMMARY AND OBJECTS OF THE INVENTION

The invention provides a system and method in which correction signals are computed and applied individually and automatically to maintain the beam on the desired path. During a programming period, alignment signals are applied to the deflection circuits in place of the normal ramp signals, and the position of the beam on the screen is monitored. When the beam is at predetermined points, the correction signals are computed and stored. During normal operation of the television system, the correction signals are addressed in accordance with the beam scan signals, and the correction signals are combined with the scan signals to maintain the beam on the desired path.

It is in general an object of the invention to provide a new and improved system and method for aligning a television display.

Another object of the invention is to provide a system and method of the above character in which individual control signals are provided for maintaining the beam at a plurality of discrete points on the screen.

Another object of the invention is to provide a system and method of the above character in which the control signals are computed individually and automatically.

Additional objects and features of the invention will be apparent from the following description in which the preferred embodiments are set forth in detail in conjuction with the accompanying drawings.

BRIEF DESCRIPTION OF THE DRAWINGS

FIG. 1 is a block diagram of one embodiment of a television display system incorporating the invention.

FIG. 2 is a block diagram of an alignment system for automatically programming the memory in the embodiment of FIG. 1.

DESCRIPTION OF THE PREFERRED EMBODIMENTS

As illustrated in the drawings, the television display system includes a scan circuit 10, a deflection amplifier 11, a deflection yoke 12 and a cathode ray tube 13. These elements are of conventional design and are of a type commonly utilized in television receivers. The scan circuit provides timing signals, e.g. square waves, and linear voltage ramps which control the horizontal and vertical deflection of the CRT beam, respectively. These signals are sychronized in such manner that the beam scans the screen in raster fashion along vertically displaced horizontal lines.

Amplifier 11 converts the timing signals and ramp voltages from the scan circuits to currents which are applied to the windings of yoke 12. The yoke is typically mounted on the neck of the cathode ray tube, and the current in the yoke windings determine the position of the beam in the CRT.

Means is provided for storing correction signals which, when combined with the signals from scan circuit 10 and amplifier 11, serve to cause the beam to be deflected to predetermined points on the face of the CRT. This means includes a memory 16 which, in the preferred embodiment, comprises a solid state memory such as a programmable read-only memory. The correction signals are stored in digital form at individually addressable locations of the memory. Address signals are applied to the memory on address lines 17 from scan circuit 10, and the correction signals are thus addressed in accordance with the scan signals which correspond to the position of the beam on the screen. The correction signals from memory 16 are converted to analog form by a digital-to-analog converter 18 and then added to the ramp signals at the input of amplifier 13.

As illustrated in FIG. 2, a computer 21 is utilized in the computation of the correction signals and programming of the memory. The computer can be either a general purpose or a special purpose digital computer, and since it is utilized only in the initial programming and alignment phases, it can be located at a test station and used for different display systems.

Means are also provided at the test station for monitoring the postion of the CRT beam during the programming phase and detecting the presence of the beam at the predetermined points on the screen. This means includes an image sensor 22 of suitable known design such as an array of photodiodes or a solid state imaging camera. When the beam is at one of the predetermined points, the image sensor delivers an output signal to the computer.

During the programming phase, the outputs of digital-to-analog converter 18 are disconnected from the input of amplifier 11 and from yoke 12, and scan correction signals are provided by the computer. These signals are applied to the input of amplifier 11 and to yoke 12 by a digital-to-analog converter 23 located at the test station. During this phase, address lines 17 are disconnected, and address signals are applied to memory 16 by the computer on lines 24.

The ramp and timing signals from scan circuit 10 are applied to the computer on lines 26, and the computer includes means for comparing these signals as a function of time with the computer generated correction signals when the beam is at the predetermined points. The correction signals are adjusted by the computer until the beam moves in a desired fashion, and the adjusted correction signals are applied to the WRITE inputs of memory 16 by lines 27.

Operation and use of the alignment system and therein the method of the invention can now be described. During the initial programming phase, the display system is brought to the test station and interconnected with the computer in the manner shown in FIG. 2. The scan signals generated by the scan circuits and computer cause the beam of the cathode ray tube to traverse the screen in raster fashion, and the position of the beam is monitored by image sensor 22.

In consumer television sets, vertical deflection is commonly produced by a ramp generator and a linear amplifier, whereas horizontal deflection is commonly produced by a square wave generator and a resonant flyback deflection system. For vertical correction, whenever the beam is at one of the predetermined points, the computer generates a correction signal corresponding to the difference in level between the ramp signal from scan circuit 10 and the scan signal generated by the computer. For horizontal correction, the computer compares the timing of the square wave from scan circuit 10 with the beam as sensed by sensor 22. The computer then generates a correction voltage and applies it through digital-to-analog converter 23 to yoke 12. The results of the correction voltages are then verified, and the correction voltages are stored at individually addressable locations in memory 16 in accordance with address signals provided by the computer, the latter being derived from the ramp signals and horizontal timing signals from scan circuit 10.

During normal operation of the display system, successive ones of the correction signals stored in the memory are addressed as the beam scans across the screen. The address signals are obtained from scan circuit 10 and correspond to the signals produced thereby. The correction signals are added to the ramp signals from the scan circuit and to the deflection currents in the yoke to deflect the beam to the predetermined points and thereby maintain it on the desired path.

The invention has a number of important features and advantages. The correction signal memory for each display is programmed individually, and individual correction is provided for a number of different points on the screen. This results in substantially better overall correction than has been possible with the techniques of the prior art. Moreover, the correction is automatic, which means that it can be done more quickly and economically than has heretofore been possible.

It is apparent from the foregoing that a new and improved system and method for aligning television displays has been provided. While only the presently preferred embodiments have been described, as will be apparent to those familiar with the art, certain changes and modifications can be made without departing from the scope of the invention as defined by the following claims.

What is claimed is:

1. In a system for aligning a television display having a modulated beam scanning a viewing screen repeatedly along a predetermined path in accordance with a cyclical deflection signal to provide a visual output display on said screen: memory means for storing at individually addressable locations thereof a plurality of correction signals which when combined with the deflection signal serve to cause the beam to be deflected to predetermined points on the path, means for applying address signals to the memory means in synchronization with the deflection signal to address successive ones of the stored correction signals as the beam scans the screen, and means for combining the successively addressed correction signals with the deflection signal to effect deflection of the beam to the predetermined points.

2. The system of claim 1 wherein the memory means comprises a solid state memory.

3. The system of claim 1 together with a source of alignment signals for deflecting the beam during a programming period, means for detecting the presence of the beam at the predetermined points during the programming period, means for computing the correction signals from the alignment signals when the beam is at the predetermined points, and means for presenting the correction signals to the memory means for storage at the individually addressable locations thereof.

4. In a method for aligning a television display having a modulated beam scanning a viewing screen repeatedly along a predetermined path in accordance with a cyclical deflection signal to provide a visual output display on said screen, the steps of: storing a plurality of correction signals which when combined with the deflection signal serve to cause the beam to be deflected to predetermined points on the path, addressing successive ones of the stored correction signals as the beam scans the screen, and combining the successively addressed correction signals with the deflection signal to effect deflection of the beam to the predetermined points.

5. The method of claim 4 further including the steps of providing alignment signals for deflecting the beam during a programming period, detecting the presence of the beam at the predetermined points during the programming period, computing the correction signals from the alignment signals when the beam is at the predetermined points, and storing the correction signals at individually addressable locations of a memory for access during subsequent operation of the display.

6. In a system for aligning the display of a television system in which the deflection of a beam on a viewing screen is controlled by a predetermined control signal generated independently of the position of the beam on the screen: means for applying an alignment signal to the display in place of the control signal during a programming period, means for detecting the presence of the beam at a plurality of predetermined points during the programming period, means responsive to the alignment signals and to the position of the beam for providing individual correction signals corresponding to the difference between the alignment signal and the control signal when the beam is at each of the predetermined points, means for storing the correction signals, means for addressing the stored correction signals in accordance with the position of the beam during subsequent operation of the television system, means for combining the addressed correction signals with the control signal, and means for applying the combined signals to the display to deflect the beam to the predetermined points during operation of the television system.

7. The system of claim 6 wherein the means for storing the correction signals is a read-only memory.

8. In a method for aligning the display of a television system in which the deflection of a beam on a viewing screen is controlled by a predetermined control signal generated independently of the position of the beam on the screen, the steps of: applying an alignment signal to the display in place of the control signal during a programming period, detecting the presence of the beam at a plurality of predetermined points during the programming period, computing individual correction signals corresponding to the difference between the alignment signal and the control signal when the beam is at each of the predetermined points, storing the correction signals, addressing the stored correction signals in accordance with the position of the beam during subsequent operation of the television system, combining the addressed correction signals with the control signal, and applying the combined signals to the display to deflect the beam to the predetermined points during operation of the television system.

* * * * *